United States Patent
Guo et al.

(10) Patent No.: US 10,951,803 B2
(45) Date of Patent: Mar. 16, 2021

(54) EXECUTION STATUS INDICATION METHOD, APPARATUS, AND UNMANNED AERIAL VEHICLE

(71) Applicant: SZ DJI TECHNOLOGY CO., LTD., Shenzhen (CN)

(72) Inventors: Zhuo Guo, Shenzhen (CN); Paul Pan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 122 days.

(21) Appl. No.: 16/108,921

(22) Filed: Aug. 22, 2018

(65) Prior Publication Data
US 2019/0014253 A1 Jan. 10, 2019

Related U.S. Application Data

(63) Continuation of application No. PCT/CN2016/077766, filed on Mar. 29, 2016.

(51) Int. Cl.
| H04N 5/232 | (2006.01) |
| B64C 39/02 | (2006.01) |
| G05D 1/00 | (2006.01) |
| B64D 47/02 | (2006.01) |
| B60Q 1/00 | (2006.01) |

(52) U.S. Cl.
CPC .............. *H04N 5/232* (2013.01); *B60Q 1/00* (2013.01); *B64C 39/024* (2013.01); *B64D 47/02* (2013.01); *G05D 1/0022* (2013.01); *G05D 1/0094* (2013.01); *H04N 5/23203* (2013.01); *B64C 2201/127* (2013.01); *B64C 2201/146* (2013.01)

(58) Field of Classification Search
CPC ............... B60Q 1/00; B64C 2201/127; B64C 2201/146; B64C 39/024; B64D 47/02; G05D 1/0022; G05D 1/0094; H04N 5/232; H04N 5/23203
See application file for complete search history.

(56) References Cited

U.S. PATENT DOCUMENTS

| 8,284,407 B2 * | 10/2012 | Briggs .................. G01B 5/008 356/614 |
| 8,903,568 B1 | 12/2014 | Wang et al. |

(Continued)

FOREIGN PATENT DOCUMENTS

| CN | 103139459 A | 6/2013 |
| CN | 103336475 A | 10/2013 |

(Continued)

OTHER PUBLICATIONS

The World Intellectual Property Organization (WIPO) International Search Report for PCT/CN2016/077766 dated Jan. 6, 2017 6 Pages (including translation).

*Primary Examiner* — Joon Kwon
(74) *Attorney, Agent, or Firm* — Anova Law Group, PLLC

(57) ABSTRACT

A method comprising receiving control instructions sent from a control device, where the control instructions are configured to instruct a photographing apparatus carried by an unmanned aerial vehicle to perform an image capturing operation; and controlling an indicator light at the unmanned aerial vehicle to indicate an execution status of the control instructions executed by the photographing apparatus.

19 Claims, 3 Drawing Sheets

Receive control instructions sent from a control device, where the control instructions are configured to instruct the photographing apparatus to perform an image capturing operation — 301

Control an indicator light at the UAV to indicate an execution status of the control instructions executed by the photographing apparatus — 302

(56) References Cited

U.S. PATENT DOCUMENTS

| | | | | |
|---|---|---|---|---|
| 2007/0138284 A1* | 6/2007 | Giordano | ............... | G06K 7/10 |
| | | | | 235/454 |
| 2007/0244608 A1* | 10/2007 | Rath | ................. | G05D 1/0038 |
| | | | | 701/3 |
| 2011/0160901 A1* | 6/2011 | Abrams, Jr. | ............ | G07F 11/44 |
| | | | | 700/232 |
| 2011/0301784 A1* | 12/2011 | Oakley | ................. | B64C 27/04 |
| | | | | 701/2 |
| 2017/0192341 A1* | 7/2017 | Casarez | ............. | F16M 11/123 |

FOREIGN PATENT DOCUMENTS

| | | |
|---|---|---|
| CN | 104598108 A | 5/2015 |
| CN | 104918020 A | 9/2015 |
| CN | 204948211 U | 1/2016 |
| CN | 303587322 S | 2/2016 |
| KR | 101559898 B1 | 10/2015 |

* cited by examiner

EXECUTION STATUS INDICATION METHOD, APPARATUS, AND UNMANNED AERIAL VEHICLE

CROSS-REFERENCE TO RELATED APPLICATION

This application is a continuation application of International Application No. PCT/CN2016/077766, filed on Mar. 29, 2016, the entire contents of which are incorporated herein by reference.

TECHNICAL FIELD

The present disclosure relates to the field of flight technology and, more particularly, to an execution status indication method, an execution status indication apparatus, and an unmanned aerial vehicle.

BACKGROUND

In conventional technologies, an unmanned aerial vehicle (UAV) is controlled by a remote controller or an application (APP). For example, an operator uses a remote controller or an APP to turn on or off a load carried by the UAV, to set an operation status of the load, and to control a flight mode of the UAV. In order to allow the controller to determine whether control instructions for operations have been sent to the UAV and whether the control instructions have been correctly executed by the load or the UAV, in conventional technologies, an indication is mainly made through an indicator light provided on the remote controller or the APP. At the same time, the operator needs to pay attention to the operation of the UAV in order to avoid harms or damages to surrounding people, properties, and environment due to a misoperation or no operation on the UAV.

SUMMARY

In accordance with the disclosure, there is provided a method. The method includes receiving control instructions sent from a control device. The control instructions are configured to instruct a photographing apparatus carried by an unmanned aerial vehicle to perform an image capturing operation. The method further includes controlling an indicator light at the unmanned aerial vehicle to indicate an execution status of the control instructions executed by the photographing apparatus.

Also in accordance with the disclosure, there is provided an apparatus. The apparatus includes a receiving circuit and a control circuit. The receiving circuit is configured to receive control instructions sent from a control device. The control instructions are configured to instruct a photographing apparatus carried by an unmanned aerial vehicle to perform an image capturing operation. The control circuit configured to control an indicator light at the unmanned aerial vehicle to indicate an execution status of the control instructions executed by the photographing apparatus.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

With unmanned aerial vehicles, people can conveniently perform aerial photography, traffic navigation, and the like. In the conventional technologies, the operator of an unmanned aerial vehicle (UAV) may often watch the indicator light provided on the remote controller or the APP, and thus attention of the operation may be distracted from watching the UAV, which may create a potential safety hazard for the operation of the UAV.

Figure 1A:
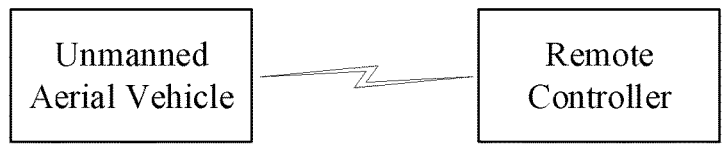
FIG. 1A is a schematic diagram of an exemplary application scenario of an exemplary execution status indicating method according to various disclosed embodiments of the present disclosure.

FIG. 1A is a schematic diagram of an exemplary application scenario of an exemplary execution status indicating method according to various disclosed embodiments of the present disclosure. As shown in FIG. 1A, the application scenario includes an unmanned aerial vehicle (UAV) and a remote controller. The remote controller may be configured to send control instructions to the UAV, e.g., to send control instructions to the UAV via keys on the remote controller. The UAV may be configured to receive control instructions from the remote controller, and to perform operations according to the control instructions. In the descriptions of some embodiments, a UAV is taken as an example merely for illustrative purposes, which is not intended to limit the scope of the present disclosure. In the present disclosure, the UAV can be replaced with an unmanned vehicle, or an unmanned boat, or the like, according to various application scenarios.

Figure 1B:
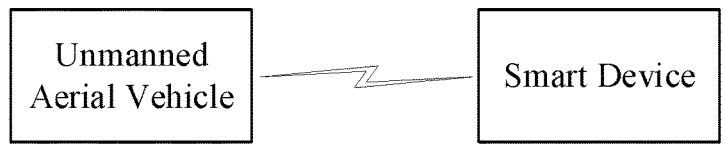
FIG. 1B is a schematic diagram of another exemplary application scenario of an exemplary execution status indicating method according to various disclosed embodiments of the present disclosure.

FIG. 1B is a schematic diagram of another exemplary application scenario of an exemplary execution status indicating method according to various disclosed embodiments of the present disclosure. As shown in FIG. 1B, the application scenario includes a UAV and a smart device. The smart device may be configured to send control instructions to the UAV, e.g., to send control instructions to the UAV through an application (APP) on the smart device. The UAV may be configured to receive control instructions from the smart device, and to perform operations according to the control instructions.

Figure 1C:
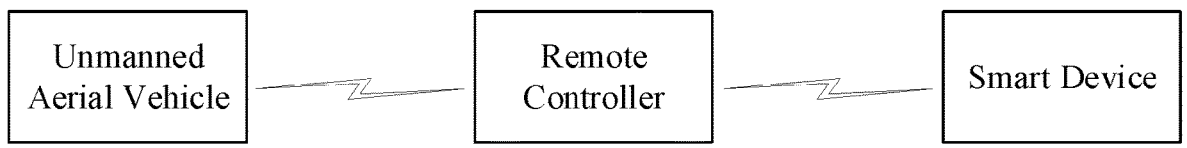
FIG. 1C is a schematic diagram of another exemplary application scenario of an exemplary execution status indicating method according to various disclosed embodiments of the present disclosure.

FIG. 1C is a schematic diagram of another exemplary application scenario of an exemplary execution status indicating method according to various disclosed embodiments of the present disclosure. As shown in FIG. 1C, the application scenario includes a UAV, a remote controller, and a smart device. The remote controller can communicate with the UAV and the smart device. In some embodiments, control instructions can be sent from the remote controller to the UAV. In some other embodiments, control instructions can be sent from the smart device to the remote controller, and then sent from the remote controller to the UAV. The UAV can receive the control instructions sent from the smart device or the remote controller, and perform operations according to the control instructions.

In some embodiments, the UAV performing operations according to the control instructions may include the UAV controlling itself according to the control instructions, e.g., controlling a flight mode of the UAV or the like, and/or may include the UAV controlling a load carried by the UAV according to the control instructions.

Figure 2:
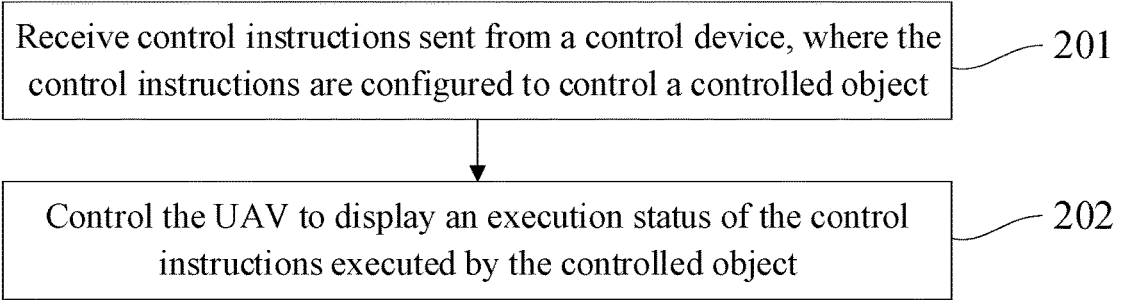
FIG. 2 is a flowchart of an exemplary execution status indicating method according to various disclosed embodiments of the present disclosure.

FIG. 2 is a flowchart of an exemplary execution status indicating method according to various disclosed embodiments of the present disclosure. With reference to in FIG. 2, the method is described below.

At 201, the UAV receives control instructions sent from a control device, where the control instructions are configured to control a controlled object.

In some embodiments, the controlled object may include a load carried by the UAV. In some other embodiments, the controlled object may include the UAV. In the embodiments that the controlled object includes the UAV, the control instructions may be configured to switch a flight mode of the controlled object. The flight mode may include, for example, a P-mode that uses a global positioning system (GPS) receiver or a visual positioning system to achieve precise hover of the UAV, or an A-mode that provides attitude stabilization without using the GPS receiver or the visual positioning system for positioning, or an F-mode as an auxiliary function mode.

In some embodiments, the load may include, for example, a camera, a robot arm, a detection instrument, or the like.

At 202, the UAV is controlled to display an execution status of the control instructions executed by the controlled object.

In some embodiments, the UAV may be controlled to display the execution status of the control instructions executed by the controlled object, such that the operator can observe, e.g., watch, the UAV to determine the execution status of the control instructions executed by the controlled object. As such, time for the operator to observe the indicator light on the remote controller or the APP may be reduced, as compared to the cases that the operator needs to observe the indicator light on the remote controller or the APP to determine the execution status of the control instructions executed by the controlled object. Accordingly, distraction of the operator's attention from observing the UAV caused by a need for the operator to constantly observe the indicator light on the remote controller or the APP may be suppressed. A potential safety hazard for the UAV operation may be suppressed.

Another exemplary execution status indicating method is provided. In some embodiments, based on above-described example(s) of execution status indicating method, an executing entity for process 201 may include a wireless receiver of the UAV, e.g., a wireless fidelity (WIFI) apparatus or a high-definition image transmission apparatus such as a Lightbridge 2 (LB2) apparatus. An executing entity of process 202 may include a main controller of the UAV.

In some embodiments, process 202 may include controlling an indicator light at the UAV to indicate an execution status of the control instructions executed by the controlled object.

An indicator light provided at a conventional UAV indicates only an operation status of the UAV itself, e.g., a UAV alarm status for a low battery level, a nose position of the UAV, a tail position of the UAV, or the like. In the present disclosure, the indicator light provided at the UAV may be controlled to display an execution status of the control instruction executed by the controlled object.

In some other embodiments, process 202 may include controlling an attitude of the UAV to indicate an execution status of the control instructions executed by the controlled object. In some embodiments the attitude of the UAV may include an overall flight attitude of the UAV or an action attitude of a movable component of the UAV. For example, the overall flight attitude of the UAV may be controlled to indicate an execution status of the control instructions executed by the controlled object, or the action attitude of the movable component of the UAV may be controlled to indicate an execution status of the control instructions executed by the controlled object. The overall flight attitude of the UAV may include, for example, leveling, climbing, gliding, turning, rolling, pitching, or the like. The action attitude of the movable component of the UAV may include, for example, a deformation of a supporting arm, etc.

In some embodiments, an indicator light at the UAV or an attitude of the UAV may be controlled to display an execution status of the control instructions executed by the controlled object, such that the operator may observe the UAV to determine the execution status of the control instructions executed by the controlled object. In the present disclosure, time for the operator to observe the indicator light on the remote controller or the APP may be reduced, and operation safety of the UAV may be improved.

Figure 3:
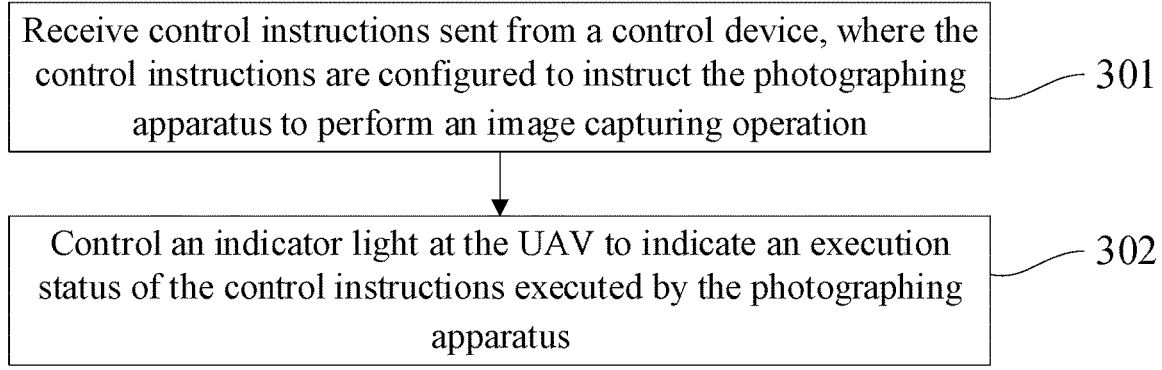
FIG. 3 is a flowchart of another exemplary execution status indicating method according to various disclosed embodiments of the present disclosure.

FIG. 3 is a flowchart of another exemplary execution status indicating method according to various disclosed embodiments of the present disclosure. The method shown in FIG. 3 is similar to that described above in connection with FIG. 2. In the embodiments shown in FIG. 3, for example, the controlled object may include a photographing apparatus, and the indicator light may be used to indicate an execution status of the control instructions executed by the controlled object for illustrative purposes. In these embodiments, as shown in FIG. 3, the method includes processes described below.

At 301, the UAV receives control instructions sent from a control device, where the control instructions are configured to instruct the photographing apparatus to perform an image capturing operation.

In some embodiments, the control device may include, for example, at least one of a remote controller, a smart device communicating with the remote controller, or a smart device communicating with the UAV.

At 302, an indicator light at the UAV is controlled to indicate an execution status of the control instructions executed by the photographing apparatus.

In some embodiments, the indicator light at the UAV may be controlled to indicate the execution status of the control instructions executed by the photographing apparatus, such that the operator can observe the UAV to determine the execution status of the control instructions executed by the photographing apparatus. Thus, time for the operator to observe the indicator light on the remote controller or the APP may be reduced, as compared to the cases that the operator needs to observe an indicator light at a remote controller or an APP to determine an execution status of control instructions executed by a photographing apparatus. Accordingly, distraction of the operator's attention from observing the UAV caused by a need for the operator to constantly observe the indicator light on the remote controller or the APP may be suppressed. A potential safety hazard for the UAV operation may be suppressed.

Another exemplary execution status indicating method is provided. In some embodiments, based on above-described examples of execution status indicating method, the executing entity for process 301 may include a wireless receiver of the UAV. The executing entity for process 302 may include a main controller of the UAV.

In some embodiments, process 302 may include controlling a color of the indicator light and/or a blinking frequency of the indicator light to indicate an execution status of the control instructions executed by the photographing apparatus.

In some embodiments, the execution status of the control instructions executed by the photographing apparatus may include an operation status of the photographing apparatus after the photographing apparatus executes the control instructions, e.g., taking videos, taking photos, or the like. Further, the execution status of the control instructions executed by the photographing apparatus may include whether the photographing apparatus successfully executes the control instructions. If the photographing apparatus successfully executes the control instructions, the operation status of the photographing apparatus after the photographing apparatus executes the control instructions may include an operation status of the photographing apparatus after the photographing apparatus successfully executes the control instructions. If the photographing apparatus fails to execute the control instructions, the operation status of the photographing apparatus after the photographing apparatus executes the control instructions may include an operation status of the photographing apparatus after the photographing apparatus fails to execute the control instructions. Further, the execution status of the control instructions executed by the photographing apparatus may include the control instructions being successfully received.

In some embodiments, the photographing apparatus may include a camera. Correspondingly, the control instructions in process 301 may be configured to instruct the camera to perform an image capturing operation. Further, the photographing apparatus may also include a gimbal for securely supporting the camera. Correspondingly, the control instructions may be configured to instruct a mode of the gimbal, also referred to as a "gimbal mode," such as, for example, a free mode, a yaw following mode, a locking mode, or the like.

If the image capturing operation of the camera is successfully executed, the color and/or the blinking frequency of the indicator light may be controlled, and controlling the color and/or the blinking frequency of the indicator light may include controlling the indicator light to emit light of a first color and/or controlling the indicator light to blink at a first frequency. For example, the indicator light may be controlled to emit green light and blink for several times. In some embodiments, controlling the indicator light to emit light of the first color and/or controlling the indicator light to blink at the first frequency may be used to indicate that the camera successfully executes the control instructions.

In some embodiments, controlling the overall flight attitude of the UAV to indicate the execution status of the control instructions executed by the camera may include, for example, the UAV performing a small-range pitching, which is similar to human nodding, to indicate that the camera successfully executes the control instructions. Controlling the attitude of the movable component of the UAV to indicate the execution status of the control instructions executed by the camera may include, for example, using a first attitude of a support frame after being deformed to indicate that the camera successfully executes the control instructions.

In some embodiments, after controlling the indicator light to emit light of the first color and/or controlling the indicator light to blink at the first frequency, the method may further include controlling the indicator light to emit light of a second color and/or controlling the indicator light to blink at a second frequency. In some embodiments, operation statuses of the camera after the camera successfully executes the control instructions may correspond to colors and/or frequencies in a one-to-one manner. That is, one operation status of the camera may correspond to one color and/or one frequency of the indicator light. For example, when the camera is at a video recording status, the indicator light may be controlled to slowly blink in red. When the camera is at a photo taking status, the indicator light may be controlled to rapidly blink in red. In some embodiments, controlling the indicator light to emit light of the second color and/or controlling the indicator light to blink at the second frequency may be used to indicate an operation status of the camera after the camera successfully executes the control instructions.

In some embodiments, controlling the overall flight attitude of the UAV to indicate the execution status of the control instructions executed by the camera may include using a selected overall flight attitude of the UAV to indicate an operation status of the camera after the camera successfully executes the control instructions. Operation statuses of the camera after the camera successfully executes the control instructions may correspond to selected overall flight attitudes in a one-to-one manner. In some embodiments, controlling the action attitude of the movable component of the UAV to indicate the execution status of the control instructions executed by the camera may include using a selected action attitude of the movable component of the UAV to indicate an operation status of the camera after the camera successfully executes the control instructions. Operation statuses of the camera after the camera successfully executes the control instructions may correspond to selected action attitudes in a one-to-one manner.

If the image capturing operation of the camera is unsuccessfully executed, the color and/or the blinking frequency of the indicator light may be controlled, and controlling the color and/or the blinking frequency of the indicator light may include controlling the indicator light to emit light of a third color and/or controlling the indicator light to blink at a third frequency. For example, the indicator light may be controlled to rapidly blink in red for several times. In some embodiments, controlling the indicator light to emit light of the third color and/or controlling the indicator light to blink at the third frequency may be used to indicate that the camera fails to execute the control instructions.

In some embodiments, controlling the overall flight attitude of the UAV to indicate the execution status of the control instructions executed by the camera may include, for example, the UAV performing a small-range left-right swinging, which is similar to human shaking head, to indicate that the camera fails to execute the control instructions. In some embodiments, controlling the action attitude of the movable component of the UAV to indicate the execution status of the control instructions executed by the camera may include, for example, using a second attitude of the support frame after being deformed to indicate that the camera fails to execute the control instructions.

In some embodiments, the photographing apparatus further includes a gimbal and the UAV includes a first indicator light and a second indicator light. The second indicator light of the UAV may be controlled to indicate an execution status of the gimbal, and the first indicator light of the UAV may be controlled to indicate an execution status of the camera. Controlling the color and/or the blinking frequency of the indicator light may further include controlling the indicator light, e.g., the second indicator light, to emit light of a fourth color and/or controlling the indicator light, e.g., the second indicator light, to blink at a fourth frequency. Operation statuses of the gimbal after the gimbal executes the control instructions, e.g., an operation status of the free mode, an operation status of the yaw following mode, or an operation status of the locking mode, may correspond to colors and/or frequencies in one-to-one manner. In some embodiments, controlling the indicator light, e.g., the second indicator light, to display the fourth color and/or controlling the indicator light, e.g., the second indicator light, to blink at the fourth frequency may be used to indicate an operation status of the gimbal after the gimbal executes, successfully or unsuccessfully, the control instructions. For example, when the gimbal is in the free mode, the indicator light, e.g., the second indicator light, of the UAV may be controlled to slowly blink in yellow. When the gimbal is in the yaw following mode, the indicator light, e.g., the second indicator light, of the UAV may be controlled to rapidly blink in yellow. When the gimbal is in the locking mode, the indicator light, e.g., the second indicator light, of the UAV may be controlled to continuously emit yellow light.

Similar to the situation for the camera, for the gimbal, not only the indicator light of the UAV may be controlled to indicate success or failure of the gimbal executing the control instructions, but also the attitude of the UAV may be controlled to indicate an execution status of the control instructions executed by the gimbal, e.g. an operation status of the gimbal after the gimbal executes the control instructions or whether the gimbal successfully executes the control instructions. Reference can be made to descriptions for the camera, which are not repeated here. Controlling the attitude of the UAV to indicate an execution status of the control instructions executed by the camera and an execution status of the control instructions executed by gimbal may include controlling the attitude of the UAV to indicate an execution status of the control instructions executed by the gimbal, and then controlling the attitude of the UAV to indicate an execution status of the control instructions executed by camera.

Further, after process 302 is performed, the method may also include controlling the indicator light at the UAV to switch from indicating the execution status of the control instructions executed by the photographing apparatus to indicating the operation status of the UAV. For example, at process 302, an indicator light at the UAV for indicating a tail position of the UAV may be controlled to indicate the execution status of the control instructions executed by the photographing apparatus; and after process 302, the indicator light may be switched to indicate the tail position of the UAV.

In some embodiments, the color and/or the blinking frequency of the indicator light at the UAV may be controlled to indicate the execution status of the control instructions executed by the photographing apparatus, such that the operator can observe the UAV to determine the execution status of the control instructions executed by the photographing apparatus. Accordingly, time for the operator to observe the indicator light at a remote controller or an APP may be reduced. Distraction of the operator's attention from observing the UAV caused by a need for the operator to constantly observe the indicator light on the remote controller or the APP may be suppressed. A potential safety hazard for the UAV operation may be suppressed.

Figure 4:
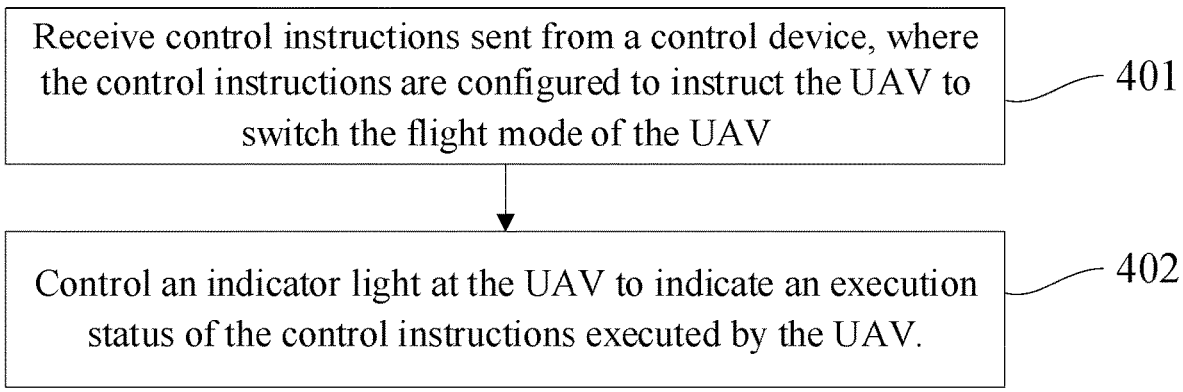
FIG. 4 is a flowchart of another exemplary execution status indicating method according to various disclosed embodiments of the present disclosure.

FIG. 4 is a flowchart of another exemplary execution status indicating method according to various disclosed embodiments of the present disclosure. The method shown in FIG. 4 is similar to that described above in connection with FIG. 2. In the embodiments shown in FIG. 3, for example, the controlled object may include a UAV, and the indicator light may be controlled to indicate an execution status of the control instructions executed by the UAV for illustrative purposes. As shown in FIG. 4, the method includes processes described below.

At 401, the UAV receives control instructions sent from a control device, where the control instructions are configured to instruct the UAV to switch the flight mode of the UAV.

In some embodiments, the control device may include, for example, at least one of a remote controller, a smart device communicating with the remote controller, or a smart device communicating with the UAV.

At 402, an indicator light at the UAV is controlled to indicate an execution status of the control instructions executed by the UAV.

In some embodiments, the indicator light at the UAV may be controlled to indicate an execution status of the control instructions executed by the UAV, such that the operator can observe the UAV to determine the execution status of the control instructions executed by the UAV. Thus, time for the operator to observe the indicator light on the remote controller or the APP may be reduced, as compared to the cases that the operator needs to observe the indicator light on the remote controller or the APP to determine the execution status of the control instructions executed by the UAV.

Accordingly, distraction of the operator's attention from observing the UAV caused by a need for the operator to constantly observe the indicator light on the remote controller or the APP may be suppressed. A potential safety hazard for the UAV operation may be suppressed.

Another exemplary execution status indicating method is provided. In some embodiments, based on above-described examples of execution status indicating method, an executing entity for process 401 may include a wireless receiver of the UAV, e.g., a wireless fidelity (WIFI) apparatus or a high-definition image transmission apparatus such as a Lightbridge 2 (LB2) apparatus. An executing entity of process 402 may include a main controller of the UAV.

In some embodiments, process 402 may include controlling a color of the indicator light and/or a blinking frequency of the indicator light to indicate an execution status of the control instructions executed by the UAV.

In some embodiments, the execution status of the control instructions executed by the UAV may include a flight mode of the UAV after the UAV executes the control instructions. Further, the execution status of the control instructions executed by the UAV may include whether the UAV successfully executes the control instructions. If the UAV successfully executes the control instructions, a flight mode of the UAV after the UAV executes the control instructions may include a flight mode of the UAV after the UAV successfully executes the control instructions. If the UAV fails to execute the control instructions, a flight mode of the UAV after the UAV executes the control instructions may include a flight mode of the UAV after the UAV fails to execute the control instructions. Further, the execution status of the control instructions executed by the UAV may also include the control instructions being successfully received.

In some embodiments, controlling the color and/or the blinking frequency of the indicator light may include controlling the indicator light to emit light of a fifth color, and/or controlling the indicator light to blink at a fifth frequency. In some embodiments, flight modes of the UAV after the UAV successfully executes the control instructions may correspond to colors and/or frequencies in a one-to-one manner. For example, when the flight mode of the UAV is the A mode, the indicator light of the UAV may blink slowly in yellow. When the flight mode of the UAV is the F mode, the indicator light of the UAV may blink rapidly in yellow. When the flight mode of the UAV is the P mode, the indicator light of the UAV may continuously emit yellow light.

Similar to the situation for the camera, for the UAV, not only the indicator light of the UAV may be controlled to indicate success or failure of the UAV executing the control instructions, but also the attitude of the UAV may be controlled to indicate an execution status of the control instructions executed by the UAV, e.g. a flight mode of the UAV after the UAV executes the control instructions or whether the UAV successfully executes the control instructions. Reference can be made to descriptions for the camera, which are not repeated here.

Further, after process 402 is performed, the method may also include controlling the indicator light at the UAV to switch from indicating the execution status of the control instructions executed by the UAV to indicating the operation status of the UAV. For example, at process 402, the UAV may control an indicator light at the UAV for indicating a nose position of the UAV to indicate the execution status of the control instructions executed by the UAV; and after process 402, the indicator light may be switched to indicate the nose position of the UAV.

In some embodiments, the color and/or the blinking frequency of the indicator light at the UAV may be controlled to indicate the execution status of the control instructions executed by the UAV, where the control instructions may be configured to control the flight mode of the UAV, such that the operator can observe the UAV to determine the execution status of the control instructions executed by the UAV. Accordingly, time for the operator to observe the indicator light on a remote controller or an APP may be reduced. Distraction of the operator's attention from observing the UAV caused by a need for the operator to constantly observe the indicator light on the remote controller or the APP may be suppressed. A potential safety hazard for the UAV operation may be suppressed.

Figure 5:
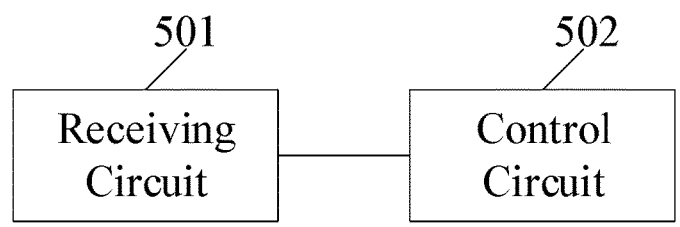
FIG. 5 is a block diagram of an exemplary execution status indicating apparatus according to various disclosed embodiments of the present disclosure.

FIG. 5 is a block diagram of an exemplary execution status indicating apparatus according to various disclosed embodiments of the present disclosure. As shown in FIG. 5, the indication apparatus includes a receiving circuit 501 and a control circuit 502. The receiving circuit 501 is configured to receive control instructions sent from a control device, where the control instructions are configured to instruct a photographing apparatus to perform an image capturing operation. The control circuit 502 is configured to control an indicator light at the UAV to display an execution status of the control instructions executed by the photographing apparatus.

In some embodiments, the execution status of the control instructions executed by the photographing apparatus may include an operation status of the photographing apparatus after the photographing apparatus executes the control instructions.

In some embodiments, the execution status of the control instructions executed by the photographing apparatus may also include whether the photographing apparatus successfully executes the control instructions. If the photographing apparatus successfully executes the control instructions, an operation status of the photographing apparatus after the photographing apparatus executes the control instructions may include an operation status of the photographing apparatus after the photographing apparatus successfully executes the control instructions. If the photographing apparatus fails to execute the control instructions, an operation status of the photographing apparatus after the photographing apparatus executes the control instructions may include an operation status of the photographing apparatus after the photographing apparatus fails to execute the control instructions.

In some embodiments, the execution status of the control instructions executed by the photographing apparatus may further include the control instructions being successfully received.

In some embodiments, the control circuit 502 may be further configured to control a color and/or a blinking frequency of the indicator light to indicate an execution status of the control instructions executed by the photographing apparatus.

In some embodiments, the photographing apparatus may include a camera, and the control instructions may be configured to instruct the camera to perform an image capturing operation.

In some embodiments, if the image capturing operation of the camera is successfully executed, the control circuit 502 may control the color and/or the blinking frequency of the indicator light. For example, the control circuit 502 may control the indicator light to emit light of a first color and/or control the indicator light to blink at a first frequency.

In some embodiments, the control circuit 502 may be further configured to control the indicator light to emit light of a second color and/or control the indicator light to blink at a second frequency. Operation statuses of the photographing apparatus after the photographing apparatus successfully executes the control instructions may correspond to colors and/or frequencies in a one-to-one manner.

In some embodiments, if the image capturing operation of the camera is unsuccessfully executed, the control circuit 502 may control the color and/or the blinking frequency of the indicator light. For example, the control circuit 502 may control the indicator light to emit light of a third color and/or control the indicator light to blink at a third frequency.

In some embodiments, the photographing apparatus may also include a gimbal, and the control instructions may be further configured to instruct the gimbal to be at a gimbal mode.

Further, the control circuit 502 may be further configured to control the indicator light to emit light of a fourth color and/or control the indicator light to blink at a fourth frequency. Operation statuses of the gimbal after the gimbal executes the control instructions may correspond to colors and/or frequencies in one-to-one manner.

In some embodiments, the control circuit 502 may be further configured to control the indicator light at the UAV to switch from indicating the execution status of the control instructions executed by the photographing apparatus to indicating the operation status of the UAV.

In some embodiments, the control device may include, for example, at least one of a remote controller, a smart device communicating with the remote controller, or a smart device communicating with the UAV.

The apparatus of the disclosure may be configured to execute a method consistent with the disclosure, such as one of the above-described methods. For more details of the apparatus, reference can be made to descriptions of the method examples, which are not repeated here.

Another exemplary execution status indicating apparatus is provided. In some embodiments, the execution status indicating apparatus may include a receiving circuit and a control circuit, similar to the above-described example(s) of indication apparatus. The receiving circuit may be configured to receive control instructions sent from a control device, where the control instructions may be configured to control a controlled object. The control circuit may be configured to control the UAV to indicate an execution status of the control instructions executed by the controlled object.

In some embodiments, the controlled object may include a load carried by the UAV, or may include the UAV. In the embodiments that the controlled object includes the UAV, the control instructions may be configured to instruct to switch a flight mode of the controlled object.

In some embodiments, the control circuit may be configured to control an indicator light at the UAV to indicate an execution status of the control instructions executed by the controlled object; or control an attitude of the UAV to indicate an execution status of the control instructions executed by the controlled object.

In some embodiments, the control circuit may control the attitude of the UAV to display the execution status of the control instructions executed by the controlled object, and controlling the attitude of the UAV may include controlling an overall flight attitude of the UAV or controlling an action attitude of a movable component of the UAV.

In these embodiments, the apparatus may be configured to execute a method consistent with the disclosure, such as one of the above-described methods. Reference can be made to descriptions of the method examples, which are not repeated here.

Another exemplary execution status indicating apparatus is provided. In some embodiments, on the basis of above-described execution status indicating apparatus, if the controlled object includes a load, the execution status of the control instructions executed by the controlled object may include an operation status of the controlled object after the controlled object executes the control instructions.

In some embodiments, the execution status of the control instructions executed by the controlled object may include whether the controlled object successfully executes the control instructions. If the controlled object successfully executes the control instructions, the operation status of the controlled object after the controlled object executes the control instructions may include an operation status of the controlled object after the controlled object successfully executes the control instructions. If the controlled object fails to execute the control instructions, the operation status of the controlled object after the controlled object executes the control instructions may include an operation status of the controlled object after the controlled object fails to execute the control instructions.

In some embodiments, the execution status of the control instructions executed by the controlled object may further include the control instructions being successfully received.

In some embodiments, the control circuit may control the indicator light at the UAV to indicate an execution status of the control instructions executed by the controlled object. For example, the control circuit may control a color and/or a blinking frequency of the indicator light to indicate the execution status of the control instructions executed by the controlled object.

In some embodiments, the load may include an image capturing apparatus, and the control instructions may be configured to instruct the photographing apparatus to perform an image capturing operation.

In some embodiments, the photographing apparatus may include a camera, and the control instructions may be configured to instruct the camera to perform an image capturing operation.

In some embodiments, if the image capturing operation of the camera is successfully executed, the control circuit may control the color and/or the blinking frequency of the indicator light. For example, the control circuit may control the indicator light to emit light of a first color and/or control the indicator light to blink at a first frequency.

In some embodiments, the control circuit may be further configured to control the indicator light to emit light of a second color and/or control the indicator light to blink at a second frequency. Operation statuses of the photographing apparatus after the photographing apparatus successfully executes the control instructions may correspond to colors and/or frequencies in a one-to-one manner.

In some embodiments, if the image capturing operation of the camera is unsuccessfully executed, the control circuit may control the color and/or the blinking frequency of the indicator light. For example, the control circuit may control the indicator light to emit light of a third color and/or control the indicator light to blink at a third frequency.

In some embodiments, the photographing apparatus may also include a gimbal, and the control instructions may be further configured to instruct the gimbal to be at a gimbal mode.

In some embodiments, the control circuit may be further configured to control the indicator light to emit light of a fourth color and/or control the indicator light to blink at a fourth frequency. Operation statuses of the gimbal after the gimbal successfully executes the control instructions may correspond to colors and/or frequencies in a one-to-one manner.

In some embodiments, the control circuit may be further configured to control the indicator light at the UAV to switch from indicating the execution status of the control instructions executed by the controlled object to indicating the operation status of the UAV.

In some embodiments, the control device may include, for example, at least one of a remote controller, a smart device communicating with the remote controller, or a smart device communicating with the UAV.

The apparatus of the disclosure may be configured to execute a method consistent with the disclosure, such as one of the above-described methods. Reference can be made to descriptions for method examples, which are not repeated here.

Another exemplary execution status indicating apparatus is provided. In some embodiments, on the basis of examples of above-described indication apparatuses for execution status, such as above-described examples of indication apparatuses for execution status of load carried by the UAV, if the controlled object includes a UAV, the execution status of the control instructions executed by the controlled object may include a flight mode of the controlled object after the controlled object executes the control instructions.

In some embodiments, the execution status of the control instructions executed by the controlled object may further include whether the controlled object successfully executes the control instructions. If the controlled object successfully executes the control instructions, the flight mode of the controlled object after the controlled object executes the control instructions may include a flight mode of the controlled object after the controlled object successfully executes the control instructions. If the controlled object fails to execute the control instructions, the flight mode of the controlled object after the controlled object executes the control instructions may include a flight mode of the controlled object after the controlled object fails to execute the control instructions.

In some embodiments, the execution status of the control instructions executed by the controlled object may further include the control instructions being successfully received.

In some embodiments, the controlled object may include the UAV, and the control circuit may control the color and/or the blinking frequency of the indicator light. For example, the control circuit may control the indicator light to indicate a fifth color and/or control the indicator light to blink at a fifth frequency. Flight modes of the UAV after the UAV executes the control instructions may correspond to colors and/or frequencies in a one-to-one manner.

In some embodiments, the control circuit may be further configured to control the indicator light at the UAV to switch from indicating the execution status of the control instructions executed by the controlled object to indicating the operation status of the UAV.

In some embodiments, the control device may include, for example, at least one of a remote controller, a smart device communicating with the remote controller, or a smart device communicating with the UAV.

The apparatus of the disclosure may be configured to execute a method consistent with the disclosure, such as one of the above-described methods. Reference can be made to descriptions for method examples, which are not repeated here.

The present disclosure further provides a UAV. The UAV may include an execution status indicating apparatus, such as one of the above-described indication apparatuses.

The structure of the UAV is described in detail below with reference to a structural diagram of the UAV.

Figure 6:
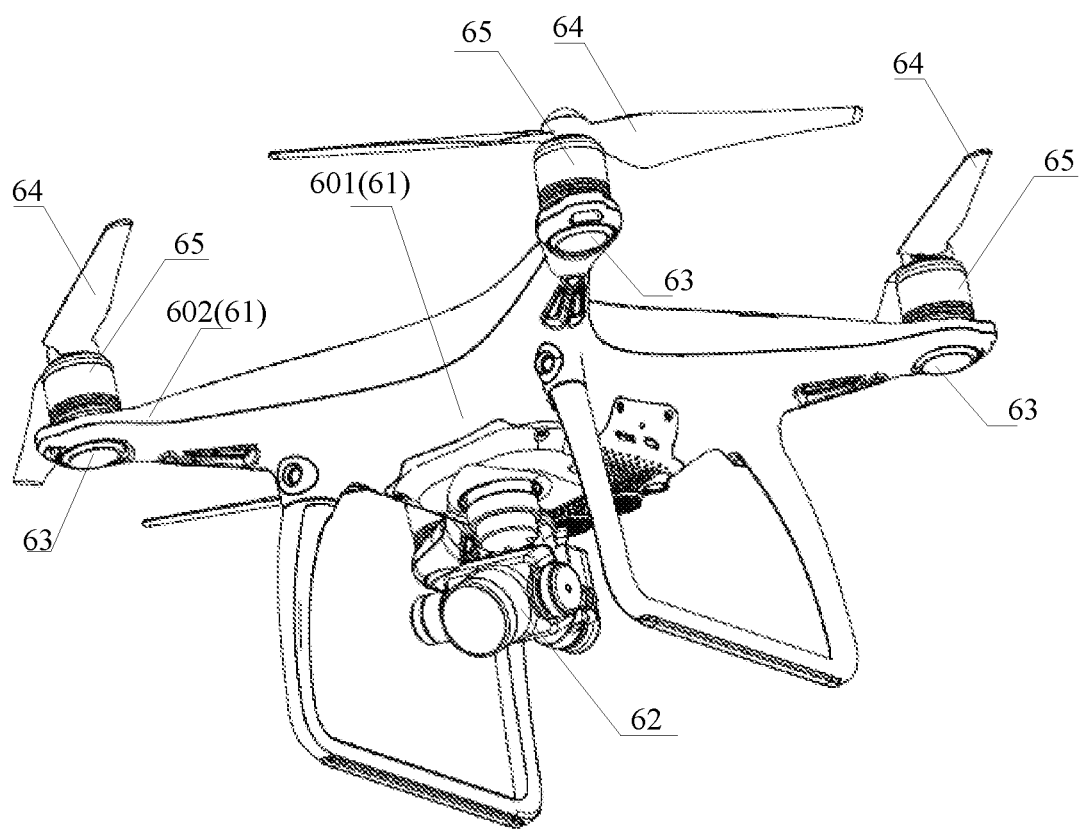
FIG. 6 is a schematic structural diagram of an exemplary unmanned aerial vehicle according to various disclosed embodiments of the present disclosure.

FIG. 6 is a schematic structural diagram of an exemplary UAV according to various disclosed embodiments of the present disclosure. As shown in FIG. 6, the UAV includes a fuselage 61, a photographing apparatus 62 disposed at the fuselage 61, one or more indicator lights 63 disposed at the fuselage 61, an execution status indicating apparatus (not shown) at the fuselage 61. The execution status indicating apparatus can be also referred to as an indication apparatus. The indication apparatus may include a receiving circuit and a control circuit. The receiving circuit may be configured to receive control instructions sent from a control device, and the control instructions may be configured to instruct the photographing apparatus 62 to perform an image capturing operation. The control circuit may be configured to control the one or more indicator lights to indicate the execution status of the control instructions executed by the photographing apparatus 62.

In some embodiments, as shown in FIG. 6, the fuselage 61 includes a fuselage center portion 601 and at least one arm 602 extending from the fuselage center portion 601. Each indicator light 63 is arranged under one arm 602.

In some embodiments, as shown in FIG. 6, the UAV further includes one or more propellers 64 and one or more motors 65 each arranged on one arm 602. A motor 65 drives the corresponding propeller 62 to rotate to provide a lift force for the UAV.

In some embodiments, the indication apparatus included in the UAV may be same as or similar to one of the above-described indication apparatuses, descriptions of which are not repeated here.

The present disclosure further provides another UAV including an indication apparatus, such as one of the above-described indication apparatuses.

Referring to FIG. 6 again, the UAV includes the fuselage 61 and an indication apparatus (not shown) disposed at the fuselage 61. In some embodiments, the indication apparatus may include a receiving circuit and a control circuit. The receiving circuit may be configured to receive control instructions sent from a control device, and the control instructions may be configured to control a controlled object. The control circuit may be configured to control the UAV to indicate an execution status of the control instructions executed by the controlled object.

In some embodiments, the controlled object may include the UAV. In some embodiments, the UAV may further include a load disposed at the fuselage, e.g., the photographing apparatus 62, and the controlled object may include the load.

In some embodiments, as shown in FIG. 6, the UAV further includes the one or more indicator lights 63 disposed at the fuselage 61. The control circuit may control the UAV to indicate an execution status of the control instructions executed by the controlled object. For example, the control circuit may control the one or more indicator lights 63 at the UAV to indicate an execution status of the control instructions executed by the controlled object.

In some embodiments, as shown in FIG. 6, the fuselage 61 further includes the fuselage center portion 601 and at least one arm 602 extending from the fuselage center portion 601. Each indicator light 63 is disposed under one arm 602.

In some embodiments, as shown in FIG. 6, the UAV further includes the one or more propellers 64 and the one or more motors 65 each disposed on one arm 602. A motor 65 may drive the corresponding propeller 62 to rotate to provide a lift force for the UAV.

In these embodiments, the indication apparatus included in the UAV may be same as or similar to one of the above-described indication apparatuses in the apparatus embodiments, descriptions of which are not repeated here.

The structural diagram of UAV in FIG. 6 is merely shown and described for illustrative purposes, which is not intended to limit the scope of the present disclosure. In the present disclosure, the structure of the UAV is not restricted, and may be chosen according to various application scenarios.

In the present disclosure, a physical circuit of the receiving circuit may include, for example, a receiver, and a physical circuit of the control circuit may include, for example, a processor. The processor may include, for example, a central processing unit (CPU). The receiver may include, for example, an antenna having a receiving function or an antenna having transmitting and receiving functions. The indication apparatus may further include a memory storing instructions that, when executed by the processor, control the process to execute a method consistent with the disclosure, such as one of the example method described above. The memory can include, for example, a USB disk, a mobile hard disk, a read-only memory (ROM), a random access memory (RAM), a magnetic disk, or an optical disk.

The present disclosure provides a method, an apparatus and a UAV for indicating execution statuses. The method may include a UAV receiving control instructions sent from a control device, where the control instructions may be configured to control a controlled object; and controlling the UAV to display an execution status of the control instructions executed by the controlled object. The present disclosure may improve safety of UAV operation.

Those of ordinary skill in the art will appreciate that the exemplary elements and algorithm processes described above can be implemented in electronic hardware as controlled by computer software. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computing device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method comprising:
   receiving control instructions sent from a control device, the control instructions being configured to instruct a photographing apparatus carried by an unmanned aerial vehicle to perform an image capturing operation, and the photographing apparatus including a camera and a gimbal carrying the camera; and
   controlling an indicator light at the unmanned aerial vehicle to indicate an execution status of the control instructions executed by the photographing apparatus, including:
      controlling the indicator light to illuminate with one of a plurality of colors or at one of a plurality of frequencies to indicate the gimbal entering one of a plurality of gimbal modes including a free mode, a yaw following mode, and a locking mode, the plurality of colors or the plurality of frequencies being in one-to-one correspondence with the plurality of gimbal modes.

2. The method according to claim 1, wherein the execution status of the control instructions comprises an operation status of the photographing apparatus after the photographing apparatus executes the control instructions.

3. The method according to claim 2, wherein:
   the execution status of the control instructions further comprises a status indicating whether the photographing apparatus successfully executes the control instructions, and
   the operation status of the photographing apparatus comprises:
      an operation status of the photographing apparatus in response to the photographing apparatus successfully executes the control instructions, or
      an operation status of the photographing apparatus in response to the photographing apparatus fails to execute the control instructions.

4. The method according to claim 1, wherein controlling the indicator light at the unmanned aerial vehicle comprises:
   controlling, by a main controller of the unmanned aerial vehicle, the indicator light at the unmanned aerial vehicle.

5. The method according to claim 1, wherein controlling the indicator light at the unmanned aerial vehicle to indicate the execution status of the control instructions further comprises:
controlling at least one of a color or a blinking frequency of the indicator light to indicate the execution status of the control instructions.

6. The method according to claim 5, wherein:
the control instructions are configured to instruct the camera to perform the image capturing operation.

7. The method according to claim 6, wherein controlling the at least one of the color or the blinking frequency of the indicator light comprises:
in response to the camera successfully performing the image capturing operation, controlling the indicator light to perform at least one of emitting light of a first color or blinking at a first frequency.

8. The method according to claim 7, wherein controlling the indicator light further comprises, after controlling the indicator light to perform at least one of emitting light of the first color or blinking at the first frequency:
controlling the indicator light to perform at least one of emitting light of a second color or blinking at a second frequency.

9. The method according to claim 6, wherein controlling the at least one of the color or the blinking frequency of the indicator light comprises:
in response to the camera failing to execute the image capturing operation, controlling the indicator light to perform at least one of emitting light of a third color or blinking at a third frequency.

10. The method according to claim 1, further comprising, after controlling the indicator light to indicate the execution status of the control instructions:
controlling the indicator light to switch from indicating the execution status of the control instructions to indicating an operation status of the unmanned aerial vehicle.

11. The method according to claim 1, wherein receiving the control instructions from the control device comprises:
receiving, by a wireless receiver of the unmanned aerial vehicle, the control instructions sent from the control device.

12. The method according to claim 1, wherein the control device comprises at least one of a remote controller, a smart device that communicates with the remote controller, or a smart device that communicates with the unmanned aerial vehicle.

13. An apparatus comprising:
a receiving circuit configured to receive control instructions sent from a control device, the control instructions being configured to instruct a photographing apparatus carried by an unmanned aerial vehicle to perform an image capturing operation, and the photographing apparatus including a camera and a gimbal carrying the camera; and
a control circuit configured to control an indicator light at the unmanned aerial vehicle to indicate an execution status of the control instructions executed by the photographing apparatus, including:
controlling the indicator light to illuminate with one of a plurality of colors or at one of a plurality of frequencies to indicate the gimbal entering one of a plurality of gimbal modes including a free mode, a yaw following mode, and a locking mode, the plurality of colors or the plurality of frequencies being in one-to-one correspondence with the plurality of gimbal modes.

14. The apparatus according to claim 13, wherein the control circuit is further configured to:
control at least one of a color or a blinking frequency of the indicator light to indicate the execution status of the control instructions.

15. The apparatus according to claim 14, wherein:
the control instructions are configured to instruct the camera to perform the image capturing operation.

16. The apparatus according to claim 15, wherein the control circuit is further configured to, in response to the camera successfully performing the image capturing operation, control the at least one of the color or the blinking frequency of the indicator light by:
controlling the indicator light to perform at least one of emitting light of a first color or blinking at a first frequency.

17. The apparatus according to claim 16, wherein the control circuit is further configured to:
control the indicator light to perform at least one of emitting light of a second color or blinking at a second frequency.

18. The apparatus according to claim 13, wherein the control circuit is further configured to:
control the indicator light to switch from indicating the execution status of the control instructions to indicating an operation status of the unmanned aerial vehicle.

19. The method according to claim 1, wherein:
the control device remotely controls the unmanned aerial vehicle;
the unmanned aerial vehicle includes a fuselage center portion, an arm extending from the fuselage center portion, and a propeller arranged at the arm; and
the indicator is arranged at the arm of the unmanned aerial vehicle and below the propeller.

* * * * *